United States Patent
Lee et al.

(10) Patent No.: US 10,389,421 B2
(45) Date of Patent: Aug. 20, 2019

(54) APPARATUS FOR ESTIMATING ARRIVAL-ANGLE AND APPARATUS FOR BEAM-FORMING

(71) Applicants: MANDO CORPORATION, Pyeongtaek-si, Gyeonggi-do (KR); Soongsil University Foundation of university-industry cooperation, Seoul (KR)

(72) Inventors: JaeEun Lee, Seoul (KR); HaeSueng Lim, Yongin-si (KR); Seong Hee Jeong, Yongin-si (KR); Hyun-Chool Shin, Seoul (KR)

(73) Assignees: Mando Corporation, Pyeongtaek-si, Gyeonggi-do (KR); Soongsil University Foundation of University-Industry Cooperation, Seoul (KR)

( * ) Notice: Subject to any disclaimer, the term of this patent is extended or adjusted under 35 U.S.C. 154(b) by 371 days.

(21) Appl. No.: 15/298,225

(22) Filed: Oct. 20, 2016

(65) Prior Publication Data
US 2017/0117946 A1    Apr. 27, 2017

(30) Foreign Application Priority Data
Oct. 22, 2015 (KR) ........................ 10-2015-0147490

(51) Int. Cl.
| | |
|---|---|
| H04B 7/06 | (2006.01) |
| H04L 5/00 | (2006.01) |
| G01S 3/72 | (2006.01) |
| G01S 7/40 | (2006.01) |
| G01S 13/34 | (2006.01) |
| G01S 13/93 | (2006.01) |
| H04B 7/08 | (2006.01) |

(52) U.S. Cl.
CPC .............. *H04B 7/0617* (2013.01); *G01S 3/72* (2013.01); *G01S 7/4021* (2013.01); *G01S 13/34* (2013.01); *G01S 13/931* (2013.01); *H04L 5/0048* (2013.01); *H04B 7/086* (2013.01)

(58) Field of Classification Search
CPC ..... H04B 7/0617; H04B 7/086; G01S 7/4021; G01S 3/72; G01S 13/931; G01S 13/34; H04L 5/0048
USPC ......................................................... 342/174
See application file for complete search history.

(56) References Cited

U.S. PATENT DOCUMENTS

| | | | | |
|---|---|---|---|---|
| 2015/0349937 A1* | 12/2015 | Kim | ...................... | H04L 5/0048 370/252 |
| 2016/0273957 A1* | 9/2016 | Bendele | ................. | G01H 1/003 |

* cited by examiner

*Primary Examiner* — Frank J McGue
(74) *Attorney, Agent, or Firm* — Hauptman Ham, LLP

(57) ABSTRACT

The present invention relates to an apparatus for estimating an arrival-angle of a reception signal and a beam-forming apparatus in a radio wave receiver, such as radar. More specifically, the present invention relates to an apparatus for accurately estimating an arrival-angle of a reception signal, or an apparatus for performing the beam-forming of a reception signal by using a multi-reception array antenna, by using a reference value that is obtained by calculating the degree of distortion of the magnitude and phase of a signal for each reception angle.

8 Claims, 8 Drawing Sheets

APPARATUS FOR ESTIMATING ARRIVAL-ANGLE AND APPARATUS FOR BEAM-FORMING

CROSS REFERENCE TO RELATED APPLICATION

This application claims priority from Korean Patent Application No. 10-2015-0147490, filed on Oct. 22, 2015, which is hereby incorporated by reference for all purposes as if fully set forth herein.

BACKGROUND OF THE INVENTION

1. Field of the Invention

The present invention relates to an apparatus for estimating an arrival-angle of a reception signal and a beam-forming apparatus in a radio wave receiver, such as radar. More particularly, the present invention relates to an apparatus for accurately estimating an arrival-angle of a reception signal, or an apparatus for performing the beam-forming of a reception signal by using a multi-reception array antenna, by using a reference value that is obtained by calculating the degree of distortion of the magnitude and phase of a signal for each reception angle.

2. Description of the Prior Art

Radar devices that are mounted on vehicles require a high-quality angular resolution. For example, a vehicle radar device for preventing and avoiding a forward collision may determine a cut-in situation by extracting an angle when a front vehicle on the adjacent lane cuts in on the travelling lane or cuts out of the same. The vehicle radar may reduce the possibility of detecting a wrong target in the case of cut-in or cut-out through the high-quality angular resolution in order to thereby predict a collision situation and in order to thereby ensure the safety of the driver.

In addition, the vehicle radar is required to have a middle/long-range detecting function for detecting a distant object in a relatively small range of angles and a short-range detecting function for detecting a nearby object in a relatively wide range of angles by using a single antenna assembly.

In addition, typical radar devices are configured to have a plurality of receiving antennas that are arranged to obtain a high-quality angular resolution. That is, the conventional radar devices adopt a structure for improving the high-quality angular resolution by arranging a plurality of channels of receiving antennas.

In such a radar device, one or more transmitting antennas may transmit transmission signals, and a plurality of receiving antenna elements may receive reflection signals that are reflected by a target in order to thereby calculate the distance and angle of the target by analyzing the reception signals.

Meanwhile, a steering vector of a beam of the reception signal may be defined by allocating a constant complex weight to a plurality of receiving antenna elements or to a plurality of receiving channels, and the beam of the reception signal may have a specific directivity according to the steering vector value.

As described above, the operation of directing a reception beam in a specific direction by using a plurality of receiving channels may be expressed as beam-forming.

Typical radar sensors have only used information about the distance and speed of an object. However, with an increasing demand for safety technology, a high-resolution digital beam-forming method has been applied, and an algorithm for accurately estimating an arrival-angle of the reception signal is required.

Meanwhile, in the typical radar devices, the reception signals that are received by a plurality of receiving channels may have different phase values due to hardware problems.

Therefore, in order to compensate for the difference of phase values for each receiving channel, a phase compensation value for each channel is to be predetermined, and the reception signal is to be compensated for by reflecting the phase compensation value for each channel in the case of actual measurement, which may be expressed as calibration.

At this time, the phase compensation value for each channel is generally determined based on the signal that is received from the front (at a reference angel, i.e., 0°) of the radar device.

Therefore, if the signal for determining the phase compensation value is received at an angle that is out of a reference position (i.e., the front position of the radar), the phase compensation value may be different depending on the angle that is out of the reference position in order to thereby deteriorate the performance of calibration.

SUMMARY OF THE INVENTION

The object of the present embodiment is to provide an apparatus that is able to improve the receiving performance of the radar.

Another object of the present invention is to provide an apparatus for setting a reference value for each measurement angle and for estimating an arrival-angle of a reception signal or performing the beam-forming of a reception signal by using the same.

Another object of the present invention is to provide an apparatus for estimating an arrival-angle or an apparatus for performing the beam-forming, which may: predetermine a reference value that is obtained by calculating the degree of distortion of the magnitude and phase of a signal for each measurement angle; calculate a phase compensation value by using the reference value; and accurately estimate an arrival-angle of a reception signal by using the phase compensation value, or perform the beam-forming of a reception signal by using the reference value.

Another object of the present invention is to provide an apparatus that performs the signal processing by using a reference value that is obtained by calculating the degree of distortion of the magnitude and phase for each measurement angle in order to: thereby reduce an estimation error of the arrival-angle according to a mismatch between the magnitude and the phase for each receiving channel, a positional error of a sensor, a signal directing error, and a mutual coupling problem; and thereby reduce a beam-forming error.

In order to achieve the object above, an embodiment of the present invention provides an apparatus for estimating an arrival-angle of a signal by using an array antenna, which may include: a phase compensation value calculating unit that is configured to obtain a phase compensation value for each measurement angle by using a reference value that is obtained by calculating the degree of distortion of the magnitude and phase of a reception signal for each measurement angle; a steering vector calculating unit that is configured to calculate a compensation steering vector by using an array antenna compensation value that is calculated by reflecting the phase compensation value and by using a predetermined steering vector; and an arrival-angle estimating unit that is configured to estimate an arrival-angle through a spectrum that is created based on the calculated compensation steering vector and the reception signal that is received from two or more receiving channels of the array antenna.

The arrival-angle estimating unit may create a compensation spectrum that is obtained by compensating for the spectrum of the reception signal by reflecting the compensation steering vector and the reception signal to a predetermined arrival-angle estimating algorithm in order to thereby estimate the arrival-angle of the reception signal by using the compensated spectrum, and the arrival-angle estimating algorithm may be one of the Bartlett beam-forming algorithm, the Capon beam-forming algorithm, or the MUSIC beam-forming algorithm.

In addition, the phase compensation value for each measurement angle may be calculated from the reference value, the number of channels of the array antenna, the distance from a reference channel to each channel, and the wavelength of the reception signal.

The reference value may be a value in the form of a two-dimensional matrix, which is determined according to the receiving channel and the measurement angle of the array antenna.

Another embodiment of the present invention provides an apparatus for performing the beam-forming of a reception signal by using an array antenna, which may include: a phase compensation value calculating unit that is configured to obtain a phase compensation value for each measurement angle by using a reference value that is obtained by calculating the degree of distortion of the magnitude and phase of a reception signal for each measurement angle; a steering vector calculating unit that is configured to calculate a compensation steering vector by using an array antenna compensation value that is calculated by reflecting the phase compensation value and by using a predetermined steering vector; and a beam-forming unit that is configured to determine the beam direction (θ) of the reception signal by using the calculated compensation steering vector and that is configured to form a reception signal beam according to the same.

The measuring apparatus, such as radar, according to the embodiment of the present invention, may set a reference value for each measurement angle, and may estimate an arrival-angle of the reception signal or may perform the beam-forming of the reception signal by using the reference value in order to thereby improve the measurement accuracy of the arrival-angle and the directivity of beam-forming.

More specifically, the apparatus may predetermine a reference value, which is obtained by calculating the degree of distortion of the magnitude and phase of a signal for each measurement angle, and may use a phase compensation value that is calculated according to the comparison with the reference value in order to thereby accurately estimate the arrival-angle of the reception signal and in order to thereby improve the beam-forming accuracy of the reception signal.

As a result, it is possible to reduce an estimation error of the arrival-angle according to a positional error of the receiving antenna, a signal directing error, and a mutual coupling problem, and to reduce a beam-forming error by correcting both an error for each measurement angle and an error for each receiving channel.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Figure 1:
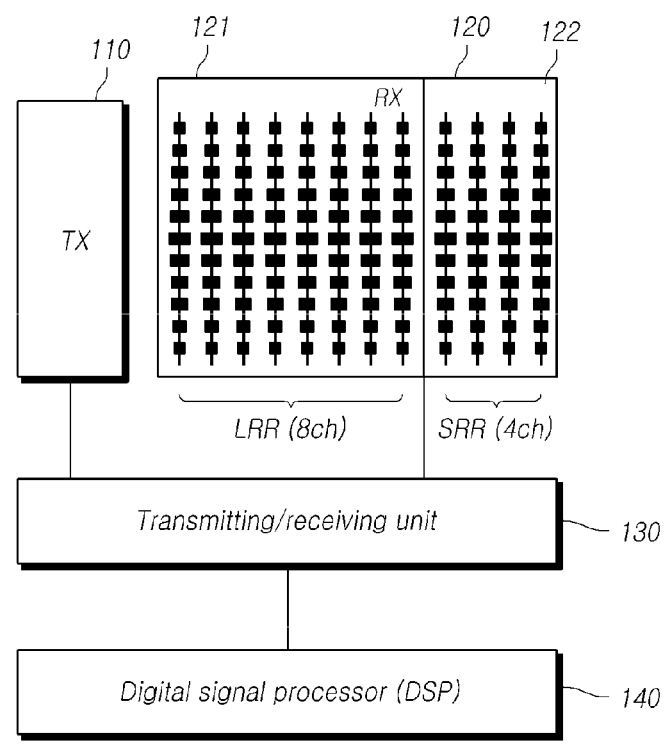
FIG. 1 illustrates an overall configuration of a radar device to which the present invention may be applied.

Hereinafter, some embodiments of the present invention will be described in detail with reference to the accompanying illustrative drawings. In designating elements of the drawings by reference numerals, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may be connected to", "be coupled to", or "be in contact with" the structural elements as well as that the certain structural element is directly connected to or is in direct contact with another structural element.

FIG. 1 illustrates an overall configuration of a radar device to which the present invention may be applied.

An apparatus for estimating an arrival-angle or a beam-forming apparatus, according to the present embodiment, may be implemented to be included in a measuring device, such as radar, which may transmit a specific transmission signal and may measure a reception signal that is reflected by a target in order to thereby measure the position, distance, and direction of the target.

FIG. 1 illustrates an example of a radar device that is one of the measuring devices, and the radar device may include: one or more transmitting antenna units 110; two or more multi-receiving antenna units 120; a transmitting/receiving unit 130 for transmitting the transmission signal and for receiving the reception signal through the transmitting/receiving antenna unit; and a digital signal processor 140.

The transmitting antenna unit 110 and the receiving antenna unit 120 may be configured by one or more antenna elements, and each antenna element may be an array antenna in which a plurality of transmitting/receiving elements are connected by transmission wires, but it is not limited thereto.

In the embodiment of FIG. 1, the transmitting antenna unit 110 is configured with a single transmitting antenna, and the receiving antenna unit 120 may include a plurality of receiving antenna elements or receiving channels.

At this time, the receiving channel may have the same meaning as the receiving antenna element, and may include m LRR receiving channels 121 for long-range radar (LRR) and n receiving channels 122 for short-range radar (SRR).

Although FIG. 1 illustrates eight receiving channels for the LRR and four receiving channels for the SRR, it is not limited thereto.

The radar device may: transmit a transmission signal that has a constant waveform and frequency through the transmitting antenna; receive a reflection signal that is reflected by a target through a plurality of receiving antenna elements; and analyze the reception signal in order to thereby measure information (e.g., distance or direction) of the target.

To this end, the transmitting/receiving unit 130 may switch to one of the transmitting antennas included in the transmitting antenna unit 110 in order to thereby transmit a transmission signal through the switched transmitting antenna, and may include a receiving unit that receives a reception signal that is a transmission signal reflected by the target through one or more of a plurality of receiving antennas.

The digital signal processor 140 may: amplify the received reflection signal; compare the same with the transmission signal; and measure a change in the phase, a change in the magnitude, the frequency shift, or the like in order to thereby measure the distance to the object, the relative speed of the object, or the like.

Meanwhile, the radar detects a target by integrating a long-range region and a short-range region, wherein a narrow region of about ±10° is detected in the long-range region and a wide region of ±45° is detected in the short-range region.

Therefore, in the case of detecting the wide region, as the angle deviates from the front, the measurement accuracy may be incorrect. This phenomenon results from the hardware (H/W) tolerance of the radar device, the phase difference depending on the receiving antennas (receiving channels), the mutual coupling between the receiving channels, or the like.

As described above, a problem of target separation may be caused by the difference of the measurement angle in the region where a reception beam for the long-range measurement overlaps a reception beam for the short-range measurement in order to thereby degrade the detection stability.

Meanwhile, the phases of reception signals for receiving channels are required to be the same when the same signal is received in each receiving channel of a typical radar device, but the phase values are actually different from each other due to various reasons mentioned above.

Therefore, it is necessary to compensate for the phase value for each receiving channel, and this operation is called calibration.

That is, for the calibration of the radar, a phase compensation value may be predetermined for each receiving channel, and the phase value of the reception signal for each receiving channel may be compensated for by using the phase compensation value in the actual measuring operation.

Meanwhile, such a phase compensation value may be calculated based on only the reception signal that is incident from the front of the radar device (that is, a reference position that has a reference angle of 0°).

However, in the case where the incident position of the reception signal is out of the reference position (0°), the accuracy of the phase compensation value becomes low so that the measurement accuracy may be lowered.

In fact, according to the calibration in which only the phase compensation value for each receiving channel is calculated and used based on the reference position, when the target is positioned at an angle of 9° to 10° with respect to the reference position, the measurement accuracy of the short-range region may be lowered so that the target may be incorrectly recognized as if there are two targets.

The present embodiment has been proposed in order to overcome the problems above by additionally compensating for the phase compensation value for each measurement angle as well as the phase compensation value for each receiving channel.

According to the present embodiment, a reference value showing the degree of distortion of the magnitude and phase of a reception signal for each measurement angle and for each receiving channel may be measured through an ideal beam pattern or through the measurement in the testing chamber, and a phase compensation value may be calculated by comparing the reference value with the magnitude/phase value of an actual reception signal to then be used.

More specifically, the arrival-angle estimating apparatus 200, according to the present embodiment, may be configured to include: a phase compensation value calculating unit 210 for obtaining a phase compensation value for each measurement angle by using a reference value that is obtained by calculating the degree of distortion of the magnitude and phase of a reception signal for each measurement angle; a steering vector calculating unit 220 for calculating a compensation steering vector by using an array antenna compensation value that is calculated by reflecting the phase compensation value and by using a predetermined steering vector; and an arrival-angle estimating unit 230 for estimating an arrival-angle through a spectrum that is created based on the calculated compensation steering vector and the reception signal that is received from two or more receiving channels of the array antenna. The detailed configuration thereof will be described below with reference to FIG. 2.

Figure 2:
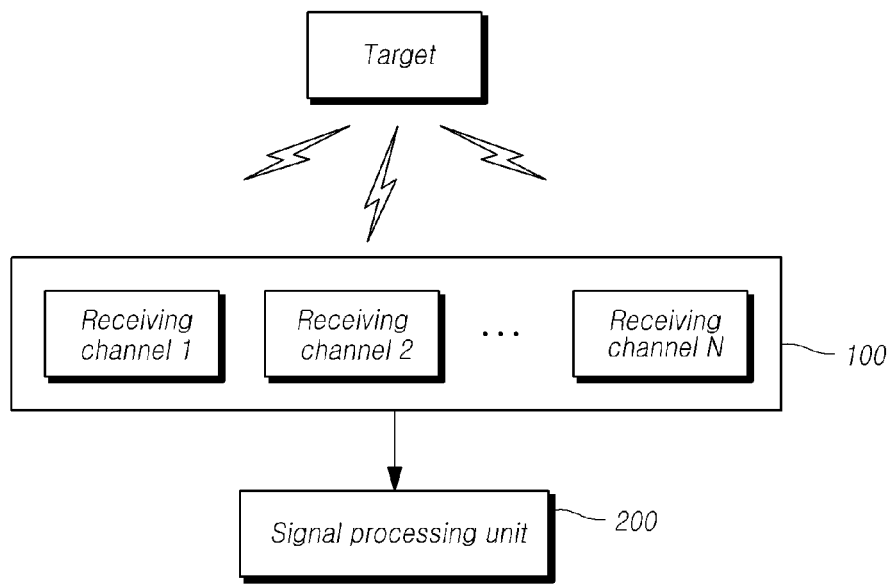
FIG. 2 is a functional block diagram of an apparatus for estimating an arrival-angle, according to an embodiment of the present invention.
Figure 3:
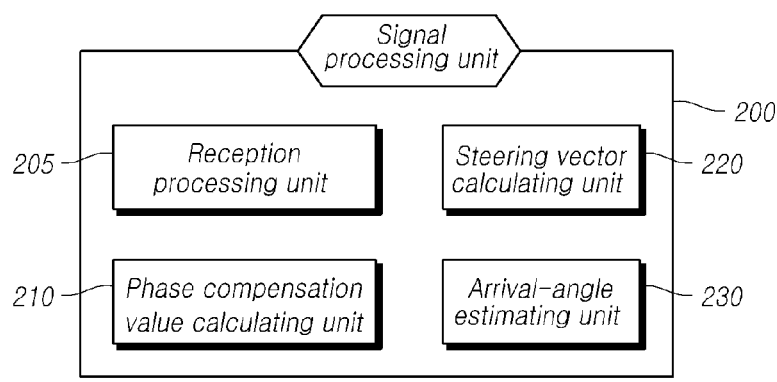
FIG. 3 is a view to explain a digital signal processor that is shown in FIG. 2.

FIG. 2 is a functional block diagram of an apparatus for estimating an arrival-angle, according to an embodiment of the present invention, and FIG. 3 is a view to explain a digital signal processor that is shown in FIG. 2.

Referring to FIG. 2, the arrival-angle estimating apparatus, according to an embodiment of the present invention, may be configured to include an array antenna 100 and a digital signal processor 200 that estimates an arrival-angle through a spectrum that is created by using a reception signal that is received from a receiving channel of the array antenna and by using a compensation steering vector.

As described in FIG. 1, the array antenna 100 may include one or more transmitting antennas and a plurality of receiving channels or receiving antennas.

For example, the receiving antenna unit constituting the array antenna may include eight receiving antennas for long-range radar (LLR) and four receiving antennas for short-range radar (SRR), but it is not limited thereto.

The digital signal processor 200 may: transmit a continuous wave signal of which the frequency linearly varies depending on time through a vehicle radar device; receive the continuous wave signal that is reflected by a target; and calculate the distance, speed, or direction of the target by using a delay time between the transmission signal and the reception signal and the frequency shift of the reception signal with respect to the transmission signal.

The digital signal processor 200 may include a reception processing unit 205, a phase compensation value calculating unit 210, a steering vector calculating unit 220, and an arrival-angle estimating unit 220.

The reception processing unit 205 may: receive a multi-reception signal through a plurality of receiving channels; perform the reception processing, such as the processing of a downlink frequency or the analog-digital conversion (ADC) in the signal path of each receiving channel; and perform the fast Fourier transform (FFT) and calibration. Here, the reception signal may be an FMCW (Frequency Modulated Continuous) LRR (long-range radar) signal of 77 GHz.

The digital signal processor 200 may further include a block that performs processes of DBF (Digital Beam-forming), CFAR (Constant False Alarm Rate), and the like with respect to the calibrated result.

The present embodiment describes only a structure of receiving a continuous wave signal, whereas the transmitting structure of the vehicle radar of FIG. 1 is not shown. However, the digital signal processor 20 may estimate an arrival-angle based on the reception signal that is transmitted by the vehicle radar and is reflected by a target.

The phase compensation value calculating unit 210 may provide a reference value in advance, which is obtained by calculating the degree of distortion of the magnitude and phase of the reception signal for each desired measurement angle, and may calculate a phase compensation value for calibration by using the provided reference value and a mathematically calculated phase value. At this time, the phase compensation value for calibration may be obtained by means of Equation 5, which will be described later.

The steering vector calculating unit 220 may obtain an array antenna compensation value with respect to each receiving antenna by using the calculated phase compensation value for calibration, and may calculate a compensation steering vector by multiplying the calculated array antenna compensation value and a predetermined steering vector. At this time, the compensation steering vector may be obtained by means of Equation 6, which will be described later.

The arrival-angle estimating unit 230 may estimate an arrival-angle that has a peak value in the FOV (Field of View) region of a spatial spectrum that is created by using the calculated compensation steering vector and the reception signal that is received from the receiving channel of the array antenna 100.

The arrival-angle estimating unit 230 may apply the compensation steering vector and the reception signal that is received from the receiving channel of the array antenna 100 to a specific arrival-angle estimating algorithm in order to thereby estimate the arrival-angle.

The arrival-angle estimating algorithm may be divided into a beam-forming algorithm and a sub-space algorithm.

The beam-forming algorithm is one of the basic arrival-angle estimating methods by using the array antenna. In the beam-forming algorithm, the array antenna may be positioned in all directions and a spatial spectrum may be created by output values so that the position indicating the maximum value may be determined as the incident direction of the signal.

At this time, the output of the array antenna may be comprised of a linear combination of antenna outputs having a coefficient of a weight for each antenna.

The output ($y(t)$) of the array antenna that is comprised of M elements may be calculated by Equation 1 below.

$$y(t) = \Sigma_{m=s}^{N} w_m * x_m(t) \qquad \text{[Equation 1]}$$

Here, $w_m$ denotes the weight of the m-th antenna, and $x_m(t)$ denotes the output of the m-th antenna. In addition, * represents a complex conjugation operator. The average output power ($P(w)$) of the array antenna may be calculated through Equation 2 below.

$$P(w) = E[|y(t)|^2] = w^H E[x(t)x^H(t)]w = w^H R w \qquad \text{[Equation 2]}$$

Here, R refers to the covariance matrix. The Bartlett beam-forming algorithm or the Capon beam-forming algorithm may be used according to the method of determining the weight vector (w).

The Bartlett beam-forming algorithm applies a spectrum analysis method based on the Fourier transform to the array antenna.

That is, a big weight is given to a signal that is incident in a specific direction in order to thereby maximize the signal output. The weight vector ($w_{BF}$) of the Bartlett beam-forming algorithm for maximizing the output of the array antenna with respect to the signal that is incident in a specific direction ($\theta$) may be calculated by Equation 3 below.

$$w_{BF} = \frac{a(\theta)}{\sqrt{a^H(\theta)a(\theta)}} \qquad \text{[Equation 3]}$$

$\alpha^H(\theta)$ refers to the steering vector of an array antenna response with respect to a specific direction ($\theta$). A spatial spectrum $P_{BF}(\theta)$ of the Bartlett beam-forming may be obtained, as shown in Equation 4, by applying Equation 3 to Equation 2.

$$P_{BF}(\theta) = \frac{a^H(\theta)Ra(\theta)}{a^H(\theta)a(\theta)} \qquad \text{[Equation 4]}$$

Meanwhile, the weight that is allocated to each receiving channel or receiving antenna for the beam-forming may be a complex weight having a complex numerical value, and a group of the complex weights with respect to a plurality of receiving channels may be defined as a steering vector.

The detailed operation of estimating an arrival-angle by the arrival-angle estimating unit will be described below.

The arrival-angle estimating apparatus, according to the embodiment of the present invention, may secure a reference value by calculating the degree of distortion of the magnitude and phase of a reception signal for each measurement angle in the manufactured chamber for a testing environment, and may estimate an arrival-angle by performing the compensation signal processing by using the reference value.

More specifically, the arrival-angle estimating apparatus may estimate an arrival-angle by measuring a reference value indicating the degree of distortion of the magnitude and phase of a reception signal for each measurement angle and for each receiving channel through an ideal beam pattern or the measurement in the testing chamber.

Figure 4:
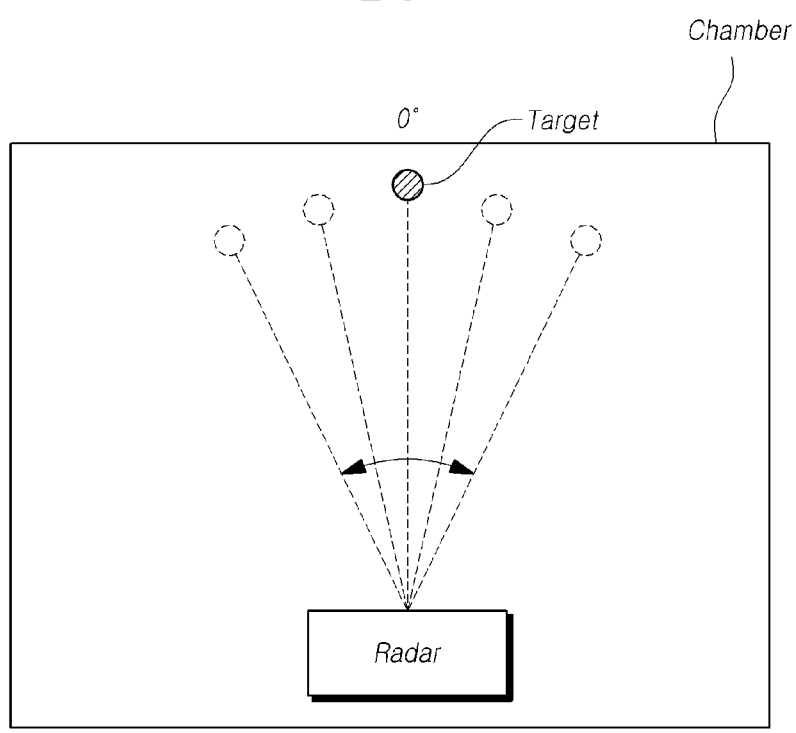
FIG. 4 illustrates an environment for calculating a reference value for each measurement angle and for each channel, according to an embodiment of the present invention.

FIG. 4 illustrates an environment for calculating a reference value for each measurement angle and for each receiving channel, according to an embodiment of the present invention.

As shown in FIG. 4, a radar device to which the present embodiment has been applied is disposed in the chamber of a testing environment, and a target is disposed in the front (the reference position; the measurement angle=0°) and at various measurement angles. Then, a signal is received for each receiving channel in order to thereby measure the degree of distortion of the magnitude and phase of the reception signal.

At this time, the degree of distortion of the magnitude and phase of the reception signal that is received in each receiving channel may be configured as a reference value when the target is disposed at various measurement angles based on the reception signal that is reflected by the target in the reference position and is received in the reference receiving channel.

The reference values may be configured in the form of a two-dimensional matrix, which has a constant value for each receiving channel and for each measurement angle as shown in Table 1 below.

TABLE 1

| Channel | Angle | | |
|---|---|---|---|
| | 0° | 5° | 10° |
| CH1 (Reference channel) | α | β | γ |
| CH2 | δ | ε | ζ |
| CH3 | η | σ | τ |

That is, the reference value of the present invention indicates the degree of distortion of the magnitude and phase of an ideal reception signal for each measured angle and for each receiving channel.

Therefore, if the signal magnitude and phase that are measured from the reception signal that is received from the target that is disposed at a specific angle are different from the reference value in the actual measuring process of the radar, the phase compensation value of the present invention may be calculated based on a difference value with respect to the reference value.

More specifically, in the case where the reference value calculated according to the manner described above is expressed as $G_m(\theta)$ (m=1, ..., M) (M refers to the number of elements of the array antenna, i.e., the number of receiving channels), the phase compensation value calculating unit 210 may perform the antenna compensation signal processing based on the reference value $G_m(\theta)$ and Equation 5 below in order to thereby calculate the phase compensation value for calibration.

$$C_m(\theta) = \frac{G_m(\theta)}{|G_m(\theta)| e^{j2\pi \frac{d_m}{\lambda} \sin(\theta)}} \quad \text{[Equation 5]}$$

In equation 5, $C_m(\theta)$ denotes a phase compensation value for compensation, and λ denotes a wavelength of the reception signal. $d_m$ indicates the distance between the reference element (the reference receiving channel or the reference receiving antenna) and each receiving antenna element.

That is, the phase compensation value $C_m(\theta)$ for each measurement angle may be calculated from the reference value $G_m(\theta)$, the number (M) of channels of the array antenna, the distance (d) between the reference channel and each channel, and the wavelength (λ) of the reception signal.

Next, the steering vector calculating unit 220 may calculate an array antenna compensation value M(θ) from Equation 6 below by using the phase compensation value $C_m(\theta)$ that is calculated in Equation 5.

$$M(\theta) = \text{diag}\left\{\frac{1}{C_1(\theta)} \frac{1}{C_2(\theta)} \cdots \frac{1}{C_M(\theta)}\right\} \quad \text{[Equation 6]}$$

In Equation 6, diag{ } represents matrix diagonalization. The compensation steering vector ($S^H(\theta)$) may be obtained by applying the array antenna compensation value (M(θ)) that is calculated by Equation 6 to Equation 7 below.

$$S^H(\theta) = \alpha^H(\theta) M(\theta) \quad \text{[Equation 7]}$$

In Equation 7, $\alpha^H(\theta)$ refers to a steering vector of an array antenna response for a specific direction (θ).

A spectrum that is compensated for by means of Equation 8 below may be obtained by applying the compensation steering vector ($S^H(\theta)$) that is calculated in Equation 7 to Equation 4 described above, respectively.

$$P_{BF}(\theta) = \frac{S^H(\theta) R S(\theta)}{S^H(\theta) S(\theta)} \quad \text{[Equation 8]}$$

That is, the phase compensation value calculating unit 210 of the arrival-angle estimating apparatus, according to the present invention, may obtain the phase compensation value $C_m(\theta)$ by using the reference value $G_m(\theta)$ that is obtained by calculating the degree of distortion of the magnitude and phase of the reception signal for each receiving channel and for each measurement angle and by using Equation 5.

Next, the steering vector calculating unit 220 may obtain the array antenna compensation value M(θ) by using the calculated phase compensation value $C_m(\theta)$ and Equation 6, and may calculate the compensation steering vector $S^H(\theta)$ by means of Equation 7 by using the array antenna compensation value M(θ) and a predetermined steering vector $\alpha^H(\theta)$ of the array antenna.

The compensation steering vector may refer to a group of a plurality of complex weights that are allocated to the receiving channels.

Next, the arrival-angle estimating unit 230 may estimate an arrival-angle through the spectrum that is created based on the calculated compensation steering vector $S^H(\theta)$ and the reception signal that is received from two or more receiving channels of the array antenna.

More specifically, the arrival-angle estimating unit 230 may compensate for the spatial spectrum $P_{BF}(\theta)$ of the Bartlett beam-forming of the reception signal by means of Equation 4 by using the calculated compensation steering vector $S^H(\theta)$ in order to thereby create the spatial spectrum $P_{BF}(\theta)$ of the compensated beam-forming as shown in Equation 8.

The position that has the greatest peak value in the compensated beam-forming spatial spectrum may be determined as the incident direction of the reception signal (i.e., the arrival-angle).

Meanwhile, the arrival-angle estimating apparatus, according to the present invention, may use the Capon beam-forming algorithm or the MUSIC beam-forming algorithm, which is a representative algorithm on the basis of a sub-space, in addition to the Bartlett beam-forming algorithm described above.

That is, the arrival-angle estimation algorithm that may be applied to the present invention may be one of the Bartlett beam-forming algorithm, the Capon beam-forming algorithm, or the MUSIC beam-forming algorithm.

The Capon beam-forming algorithm gives a relatively small weight to an interference signal or noise while maintaining the gain of the signal that is incident in a specific direction to be constant.

The MUSIC beam-forming algorithm, which is a representative algorithm on the basis of a sub-space, separates an array antenna output into a signal sub-space and a noise sub-space through the eigenvalue decomposition of the covariance matrix in order to thereby estimate the arrival-angle by using information of the sub-spaces.

The Capon beam-forming algorithm and the MUSIC beam-forming algorithm are widely used in the field of beam-forming, so the detailed description thereof will be omitted in the present specification.

Figure 5:
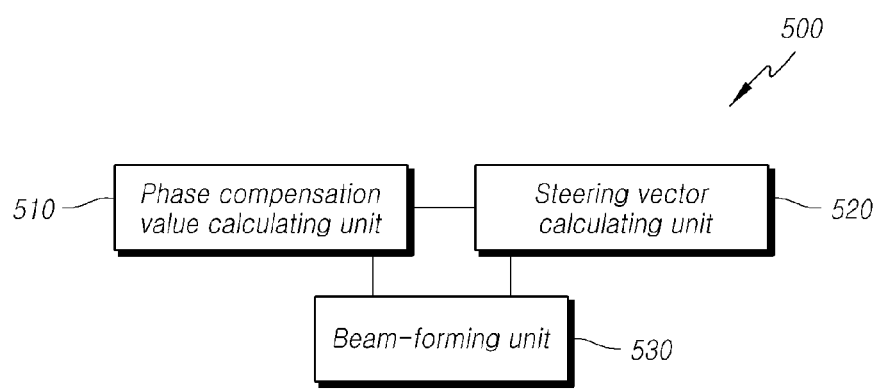
FIG. 5 is a functional block diagram of a beam-forming apparatus of a reception signal, according to an embodiment of the present invention.

FIG. 5 is a functional block diagram of a beam-forming apparatus of a reception signal, according to an embodiment of the present invention.

As shown in FIG. 5, the beam-forming apparatus, according to the present embodiment, may perform the beam-forming of a reception signal by using the array antenna including a plurality of receiving antennas, and may include radar.

The beam-forming apparatus 500 may be configured to include a phase compensation value calculating unit 510, a steering vector calculating unit 520, and a beam-forming unit 530.

The phase compensation value calculating unit 510 may obtain a phase compensation value for each measurement angle by using a reference value that is obtained by calculating the degree of distortion of the magnitude and phase of a reception signal for each measurement angle. Since the phase compensation value calculating unit 510 has the same function as that of the phase compensation value calculating unit of the arrival-angle estimating apparatus described in FIG. 2, the detailed description thereof will be omitted to avoid duplication.

The steering vector calculating unit 520 may perform a function of calculating a compensation steering vector by using the array antenna compensation value that is calculated by reflecting the calculated phase compensation value and by using a predetermined steering vector. Since the steering vector calculating unit 520 has the same configuration as that of the steering vector calculating unit of the arrival-angle estimating apparatus described in FIG. 2, the detailed description thereof will be omitted to avoid duplication.

The beam-forming unit 530 may determine the beam direction (θ) of the reception signal by using the calculated compensation steering vector in order to thereby perform a function of forming a reception signal beam.

More specifically, the phase compensation value calculating unit 510 of the beam-forming apparatus, according to the present invention, may obtain the phase compensation value $C_m(\theta)$ by using the reference value $G_m(\theta)$ that is calculated by means of the degree of distortion of the magnitude and phase of a reception signal for each measured angle and for each receiving channel and by using Equation 5.

Next, the steering vector calculating unit 520 may obtain the array antenna compensation value M(θ) by using the calculated phase compensation value $C_m(\theta)$ and Equation 6, and may calculate the compensation steering vector $S^H(\theta)$ through Equation 7 by using the array antenna compensation value M(θ) a predetermined steering vector $\alpha^H(\theta)$ of the array antenna.

The beam-forming unit 530 may form a reception beam to have a desired beam angle (θ) by using the calculated compensation steering vector $S^H(\theta)$.

That is, the beam-forming apparatus, according to the present invention, may predetermine a reference value that is obtained by calculating the degree of distortion of the magnitude and phase of a signal for each measurement angle, and may compensate the steering vector of a reception beam by using the calculated phase compensation value according to the comparison with the reference value in order to thereby secure an accurate beam-forming directivity.

Figure 6:
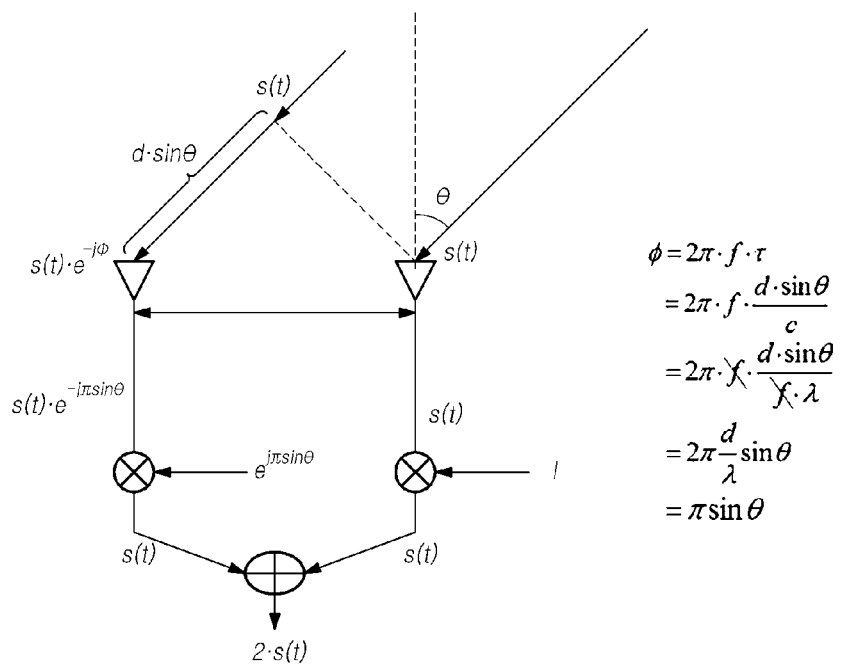
FIG. 6 illustrates the principle in which the beam-forming is performed, according to an embodiment of the present invention.

FIG. 6 illustrates the principle in which the beam-forming is performed, according to an embodiment of the present invention.

FIG. 6 illustrates the beam-forming that is performed in the case of a beam angle (θ) by using two receiving channels.

In FIG. 6, the right receiving antenna corresponds to a reference receiving channel, and the left receiving antenna refers to the first channel receiving antenna that is spaced by a distance (d) from the reference receiving antenna. At this time, the distance (d) may be assumed to be the half (λ/2) of the signal wavelength.

At this time, there may be a distance difference of d*sin θ between the reception signal s(t) that is received by the reference receiving antenna and the reception signal that is received by the first channel receiving antenna that is spaced by the distance (d) from the same so that the phase difference (φ) may occur as shown in Equation 9 below.

$$\phi = 2\pi \cdot f \cdot \tau = 2\pi \cdot f \cdot \frac{d \cdot \sin\theta}{c} = 2\pi \frac{d}{\lambda} \sin\theta = \pi \sin\theta \quad \text{[Equation 9]}$$

That is, in the case where the phase value of the signal that is received through the reference channel is zero, the signal that is received through the first channel may have a phase value of $-j\pi \sin\theta$. Therefore, in order to form a beam having a beam angle of θ by using two receiving antennas, a complex weight of 1 is allocated to the reference channel and a complex weight of $e^{j\pi \sin\theta}$ is allocated to the first receiving channel.

Similarly, a complex weight of $e^{j2\pi \sin\theta}$ may be allocated to the second receiving channel that is spaced by 2d from the reference channel.

As described above, the reception beam may have a constant directional angle (θ) by allocating unique complex weights to a plurality of receiving channels. At this time, the group of the complex weights to be allocated to a plurality of receiving channels may be defined as a steering vector.

In the present invention, with regard to the beam-forming or the angle estimation as described in FIG. 6, the phase compensation value is used, which is calculated based on the aforementioned reference value for each measurement angle when calculating the steering vector for determining the direction of the reception signal.

That is, the present invention may calculate the phase compensation value $C_m(\theta)$ that is calculated based on the reference value for each measurement angle (Equation 5), the array antenna compensation value $M(\theta)$ (Equation 6), and the compensation steering vector $S^H(\theta)$ by using a predetermined steering vector $\alpha^H(\theta)$ of the array antenna (Equation 7), and may perform the beam-forming by using the compensation steering vector as shown in FIG. 6.

Figure 7:
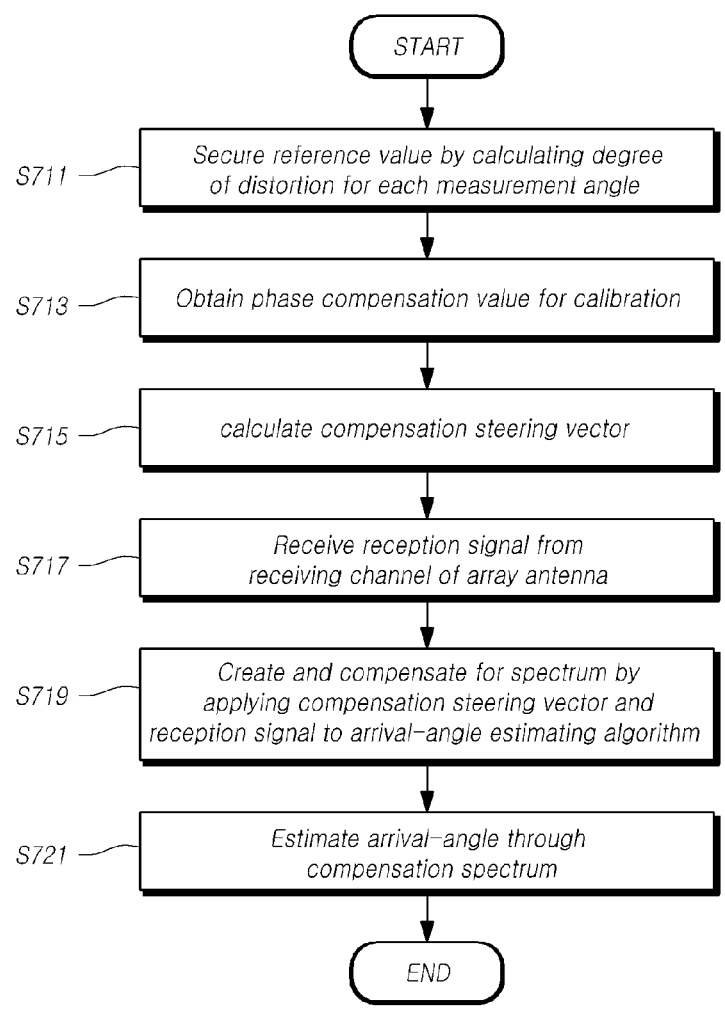
FIG. 7 is an overall flowchart of a method for estimating an arrival-angle, according to an embodiment of the present invention.

FIG. 7 is a flowchart of a method for estimating an arrival-angle, according to an embodiment of the present invention.

Referring to FIG. 7, the digital signal processor 200 included in the arrival-angle estimating apparatus may secure a reference value that is obtained by calculating the degree of distortion of the magnitude and phase of a reception signal for each desired measurement angle (S711). The reference value may be obtained by calculating the degree of distortion of the magnitude and phase for each angle in the manufactured chamber of a testing environment.

The digital signal processor 200 may obtain a phase compensation value for calibration (S713). That is, the digital signal processor 200 may apply the reference value that is obtained in operation S711 and an ideal phase value that is mathematically calculated to Equation 5 described above in order to thereby obtain the phase compensation value for calibration.

The digital signal processor 200 may obtain an array antenna compensation value through the matrix diagonalization of the phase compensation value for calibration, which is obtained in operation S713, and may calculate a compensation steering vector by multiplying the an array antenna compensation value and a steering vector (S715).

The array antenna compensation value may be calculated according to Equation 6 described above, and the compensation steering vector may be calculated according to Equation 7 described above.

Thereafter, the digital signal processor 200 may receive a reception signal from the receiving channel of the array antenna (S717). Although the present embodiment shows that the reception signal is received from the receiving channel of the array antenna after operation S715, the present invention is not limited to the sequence above, and the reception signal may be received from the receiving channel of the array antenna before operation S719, which will be described later.

The digital signal processor 200 may apply the compensation steering vector that is calculated in operation S715 and the reception signal that is received in operation S717 to an arrival-angle estimating algorithm in order to thereby create a spatial spectrum (S719). The arrival-angle estimating algorithm may be one of the Bartlett beam-forming algorithm, the Capon beam-forming algorithm, or the MUSIC algorithm.

The spatial spectrum created through the operations above may be different from the spectrum that is obtained based on an ideal phase value, which may be expressed as the compensated spectrum.

The digital signal processor 200 may estimate an arrival-angle through the compensated spectrum that is created in S719 (S721). That is, the digital signal processor 200 may estimate the angle that has the greatest peak value in the created spectrum to be the arrival-angle.

Figure 8:
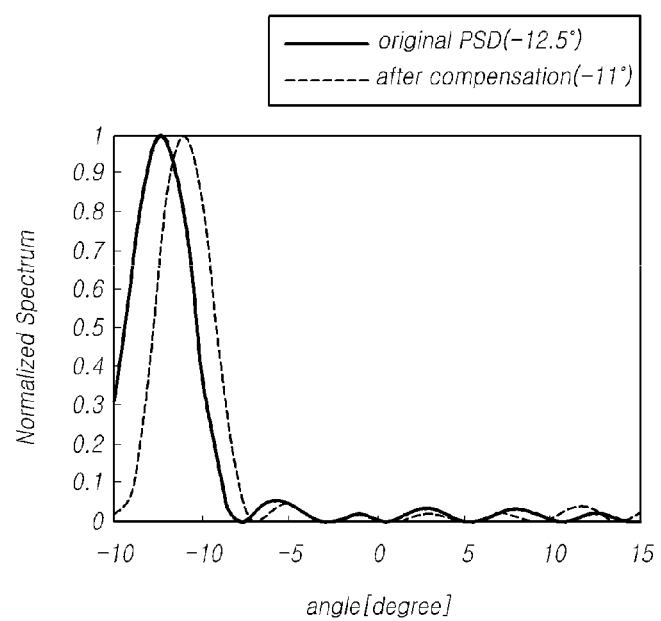
FIG. 8 is a graph showing the result of simulation of the Bartlett beam-forming algorithm that is used in an embodiment of the present invention.

FIG. 8 is a graph showing the result of simulation of the Bartlett beam-forming algorithm that is used in an embodiment of the present invention.

FIG. 8 shows the result of simulation of the Bartlett beam-forming algorithm for the actual arrival-angle of −11°.

With regard to the simulation conditions, the input signal was simulated for all data while changing the arrival-angle by 1° with respect to the arrival-angle of −11° to 0°, and the distance between the elements was 1.6 λ. In addition, the number of array antenna elements or the number of receiving channels is eight, and the number of targets is one.

The estimation of the arrival-angle before compensation was made while increasing the steering vector ($\theta_L$) by 0.5° and Equation 4 was applied. The estimation of the arrival-angle after compensation was made while increasing the steering vector ($\theta_L$) by 1° because the compensation values are provided by 1°, and Equations 5 to 7 were applied.

As shown in FIG. 8, the arrival-angle of the original spectrum (Original PSD), which is not compensated for according to the present embodiment, is −12.5°, which is different from the actual arrival-angle.

Meanwhile, the result after the compensation, according to the present invention, indicates −11° in all data, which proves the compensation effect.

Table 1 below shows the results before and after the compensation while changing the actual angle in the range of −11° to 0°, but the range of −11° to 0° is only an example.

It can be seen that all angles match the actual arrival-angles after the compensation by using the Bartlett beam-forming algorithm in order to thereby have the compensation effect.

TABLE 2

| Arrival-angle | using Bartlett beam-forming algorithm | |
|---|---|---|
| (°) | Before (°) | After (°) |
| −11 | −12.5 | −11 |
| −10 | −11.5 | −10 |
| −9 | −10 | −9 |
| −8 | −9 | −8 |
| −7 | −8 | −7 |
| −6 | −7 | −6 |
| −5 | −5.5 | −5 |
| −4 | −4.5 | −4 |
| −3 | −3.5 | −3 |
| −2 | −2 | −2 |
| −1 | −1 | −1 |
| 0 | 0 | 0 |

As shown in Table 2, the conventional arrival-angle estimating algorithm is inaccurate when estimating angles, but the inaccuracy of the angle estimation can be solved by performing the compensation signal processing by applying the compensation steering vector that is calculated by using a reference value that is obtained by calculating the degree of distortion of the magnitude and phase for each angle to the arrival-angle estimating algorithm.

Table 2 shows the comparison of the results before and after the compensation with respect to the Bartlett beam-forming algorithm, and the simulation result was confirmed in relation to the FMCW LRR signal of 77 GHz.

As a result of the test, although the value matches the actual arrival-angle in some cases before the compensation, most values are different from the actual arrival-angles by 0.5° to 1.5°.

The present embodiment has confirmed that the value can be calibrated to the actual arrival-angle by reflecting the compensation steering vector that is finally calculated by using the reference value that is obtained by calculating the degree of distortion of the magnitude and phase for each angle.

Meanwhile, although it is not shown in the drawing, it was confirmed that a similar arrival-angle compensation effect can be obtained in the case of using the Capon beam-forming algorithm and the MUSIC beam-forming algorithm in addition to the Bartlett beam-forming algorithm.

As described above, The measuring apparatus, such as radar, according to the embodiment of the present invention, may set a reference value for each measurement angle, and may estimate an arrival-angle of the reception signal or may perform the beam-forming of the reception signal by using the reference value in order to thereby improve the measurement accuracy of the arrival-angle and the directivity of beam-forming.

More specifically, the apparatus may predetermine a reference value, which is obtained by calculating the degree of distortion of the magnitude and phase of a signal for each measurement angle, and may use a phase compensation value that is calculated according to the comparison with the reference value in order to thereby accurately estimate the arrival-angle of the reception signal and in order to thereby improve the beam-forming accuracy of the reception signal.

As a result, it is possible to reduce an estimation error of the arrival-angle according to a positional error of the receiving antenna, a signal directing error, and a mutual coupling problem and to reduce a beam-forming error by correcting both an error for each measurement angle and an error for each receiving channel.

The above description and the accompanying drawings provide an example of the technical idea of the present invention for illustrative purposes only. Those having ordinary knowledge in the technical field, to which the present invention pertains, will appreciate that various modifications and changes in form, such as combination, separation, substitution, and change of a configuration, are possible without departing from the essential features of the present invention. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. An apparatus for estimating an arrival-angle of a signal by using an array antenna, the apparatus comprising:
   a transmitting antenna configured to transmit a transmission signal to a target;
   a plurality of receiving antenna configured to receive a signal reflected by the target through a plurality of receiving channels; and
   a digital signal processor configured to
      amplify the received signal, and
      measure changes between the transmission signal and the received signal by analysing the received signal with the transmission signal to thereby measure information for the target,
   wherein the digital signal processor comprises:
      a phase compensation value calculating circuit configured to obtain a phase compensation value for each measurement angle by using a reference value that is obtained by calculating the degree of distortion of the magnitude and phase of the received signal for each measurement angle;
      a steering vector calculating circuit configured to calculate a compensation steering vector by using an array antenna compensation value that is calculated by reflecting the phase compensation value and by using a predetermined steering vector; and
      an arrival-angle estimating circuit configured to estimate an arrival-angle through a spectrum that is created based on the calculated compensation steering vector and the received signal that is received from two or more receiving channels of the array antenna.

2. The apparatus according to claim 1, wherein the arrival-angle estimating circuit creates a compensation spectrum that is obtained by compensating for the spectrum of the received signal by reflecting the compensation steering vector and the received signal to a predetermined arrival-angle estimating algorithm in order to thereby estimate the arrival-angle of the received signal by using the compensation spectrum.

3. The apparatus according to claim 2, wherein the arrival-angle estimating algorithm is one of the Bartlett beam-forming algorithm, the Capon beam-forming algorithm, or the MUSIC beam-forming algorithm.

4. The apparatus according to claim 1, wherein the phase compensation value for each measurement angle is calculated from the reference value, the number of channels of the array antenna, the distance from a reference channel to each channel, and the wavelength of the received signal.

5. The apparatus according to claim 1, wherein the reference value is a value in the form of a two-dimensional matrix, which is determined according to the receiving channel and the measurement angle of the array antenna.

6. An apparatus for performing the beam-forming of a reception signal by using an array antenna, the apparatus comprising:
   a transmitting antenna configured to transmit a transmission signal to a target; and
   a plurality of receiving antenna configured to receive a signal reflected by the target through a plurality of receiving channels,
   wherein the apparatus is configured to
      amplify the received signal, and
      measure changes between the transmission signal and the received signal by analysing the received signal with the transmission signal to thereby measure information for the target,
   wherein the apparatus comprises:
      a phase compensation value calculating circuit configured to obtain a phase compensation value for each measurement angle by using a reference value that is obtained by calculating the degree of distortion of the magnitude and phase of a reception signal for each measurement angle;
      a steering vector calculating circuit configured to calculate a compensation steering vector by using an array antenna compensation value that is calculated by reflecting the phase compensation value and by using a predetermined steering vector; and
      a beam-forming circuit configured to determine the beam direction ($\theta$) of the reception signal by using the calculated compensation steering vector and configured to form a reception signal beam according to the same.

7. The apparatus according to claim 6, wherein the phase compensation value for each measurement angle is calculated from the reference value, the number of channels of the array antenna, the distance from a reference channel to each channel, and the wavelength of the reception signal.

8. The apparatus according to claim 6, wherein the reference value is a value in the form of a two-dimensional matrix, which is determined according to the receiving channel and the measurement angle of the array antenna.

* * * * *